Patented Oct. 30, 1945

2,388,169

UNITED STATES PATENT OFFICE 2,388,169

ELASTOMERS FROM ETHYLENE INTERPOLYMERS

Ambrose McAlevy, Daniel E. Strain, and Franklin S. Chance, Wilmington, Del., assignors to E. I. du Pont de Nemours & Company, Wilmington, Del., a corporation of Delaware No Drawing. Application January 24, 1944, Serial No. 519,545

15 Claims. (Cl. 260—79)

This invention relates to cured interpolymers of ethylene and organic acid esters of vinyl alcohol, and more particularly to the curing of pyrolyzed interpolymers of ethylene and organic acid esters of vinyl alcohol.

Interpolymers of ethylene and organic acid esters of vinyl alcohol are described in the U. S. Patent of M. W. Perrin et al., 2,200,429, patented May 14, 1940, wherein they are prepared by the simultaneous polymerization of ethylene with a vinyl ester. These interpolymers may be prepared from ethylene and vinyl acetate, propionate, butyrate, acrylate, methacrylate, or the higher, straight and branch chain vinyl esters of the aliphatic organic acids generally; similar interpolymers can likewise be prepared from ethylene and the aromatic acid esters of vinyl alcohol. In contradistinction to these interpolymers, natural rubber, and the various diene interpolymers all contain olefinic unsaturation before and after vulcanization. There is substantially no olefinic unsaturation in the interpolymer of ethylene and organic acid ester of vinyl alcohol, and accordingly the interpolymer is not directly convertible to worthwhile products by the usual vulcanization or curing processes.

It is an object of this invention to provide a vulcanized elastomer from an interpolymer of ethylene and an organic acid ester of vinyl alcohol. A further object of the invention is to provide a method of so treating an interpolymer of ethylene and an organic acid ester of vinyl alcohol that the treated interpolymer can be readily vulcanized and/or compounded and thereafter transformed into valuable cured products. Another object is to provide cured interpolymers of ethylene and organic acid esters of vinyl alcohol, and more particularly cured interpolymers of ethylene and vinyl acetate. Yet another object is to provide a process wherein an interpolymer of ethylene and a vinyl ester is pyrolyzed and subsequently cured. Other objects and advantages of the invention will hereinafter appear.

The elastomers are prepared in accord with the process of this invention by a two-step process; in the first step, the interpolymer of the ethylene and an organic acid ester of vinyl alcohol is pyrolyzed and in the second step the thus pyrolyzed interpolymer is combined with compounding agents and then cured.

The first step of the process, involving pyrolysis of the interpolymer, should be carried out at a comparatively low temperature for the production of elastomers having most desirable properties. For example, the interpolymer is pyrolyzed at a temperature below 400° C. and generally at a temperature between 250 and 400° C. with preferred temperatures ranging between 280 and 325° C. It has been found desirable to conduct the pyrolysis of the interpolymer in the atmosphere of an inert gas or contrariwise it may be conducted in a solvent of the interpolymer such as benzene, chlorbenzene, toluene, or similar inert solvents. The pyrolysis removes acyloxy groups from the polymer chains and is believed to form thereby unsaturated bonds between adjacent carbon atoms from which said groups have been withdrawn. In order that the product may be uniform in the unsaturated groups present, it is desirable for best results that the entire mass of interpolymers be at the same temperature throughout the pyrolysis. Moreover, it is essential that the temperature be maintained below about 400° C. in order to inhibit breakdown of the polymer chain.

It has been found that within the above temperature ranges and particularly within the preferred temperature range, little or no break-down of the polymer chain occurs during the pyrolysis and the principal reaction during this treatment involves the release of the acyloxy groups. At higher temperatures the acyloxy groups are driven off more rapidly but concurrently the competing reaction sets in at these higher temperatures resulting in the fissure of the polymer chain giving a number of fragments which are not as suitable as the unbroken polymer for subsequent treatment. Accordingly the higher temperatures should, as has been indicated, be avoided and particularly temperatures above 400° C., which result in waxy or greasy products not suitable for the preparation of elastomers having the most desirable properties.

It is neither necessary nor desirable to remove all of the acyloxy groups. Nevertheless, it has been found that the interpolymer should be pyrolyzed to such an extent that its iodine number (which connotes unsaturation) is at least 0.5 (by the modified Wijs analytical process) for the preparation of an interpolymer which can be cured to give the most desirable elastomers.

Elastomers are obtained in accord with the second step of the process by curing these pyrolyzed interpolymers, the curing operation being conducted after compounding the interpolymer with sulfur and/or a rubber vulcanization accelerator, and a group II metal oxide. The resulting mixture is heated with or without the application of pressure, this treatment giving products having many rubber-like properties, some of which are superior to the corresponding properties of vulcanized rubber, and may vary like rubber from elastic to hard, rigid products.

In accord with this application and appended claims, the term "curing" will be used to mean that the pyrolyzed interpolymer has been subjected to heat with or without pressure and the product so treated has imparted to it improved properties, especially with respect to greater solvent resistance, higher softening point, and increased tensile strength. Many of the cured products have rubber-like properties and it is accordingly logical to assume that "curing" is somewhat analogous to vulcanization of rubber, although in the problem solved by this invention no lessons could be drawn from the vulcanization of rubber, for in contradistinction to rubber, the interpolymers contemplated herein are, prior to pyrolysis, essentially free from unsaturation.

The pyrolyzed ethylene-vinyl ester interpolymers are compounded in preparation for curing by mixing them with the desired amounts of compounding ingredients on regular rubber mill rolls, in a Banbury mixer or similar equipment which compounding may be effected at about room temperature or above. The milled or mixed product is then cured by heating at a temperature of at least 100° C. for at least fifteen minutes. If desired, shaped articles may be prepared by curing the compounded product, under pressure in a suitable mold.

Examples will now be given illustrating preferred embodiments of the invention, in which parts are by weight unless otherwise indicated.

*Example 1.*—An ethylene/vinyl acetate interpolymer which had a calculated molecular weight between 20,000 to 30,000 and in which the molal ratio of ethylene to vinyl acetate was 7:1, was heated in benzene (25 parts of interpolymer per 100 parts of benzene) in a closed vessel (pressure=30 atmospheres) at 250° C. for 60 minutes. The product was then removed to an open vessel, wherein it was freed of benzene by directing a current of steam into the vessel. The resulting resin was removed, and was treated on a rubber mill at 50° to 100° C. until the substantially water-free product was a dark, tough, non-tacky resin, which had an iodine number of 1.63.

To 100 parts of this resin was added (by mixing on the rubber mill) 20 parts channel black, 2 parts sulfur, 5 parts zinc oxide, 1 part captax (mercaptobenzothiazole) and 1 part "Tetrone" A (dipentamethylenethiuram tetrasulfide). The mixture was placed in a mold and was heated for 60 minutes at 145° C. A vulcanizate which had a tensile strength of 2100 pounds per square inch, and an elongation of 700% at the break point was thus obtained. This product resembled vulcanized rubber in appearance.

*Example 2.*—An ethylene/vinyl acetate interpolymer which had a molecular weight of about 10,000 to 20,000 and in which the molal ratio of ethylene to vinyl acetate was 3:1 was heated in a nitrogen atmosphere at 245° to 295° C. under atmospheric pressure. Under these conditions 44% of the acetic acid initially combined in the copolymer was expelled in 93 minutes. The resulting resin was in the form of a resilient, tough, sponge-like rubbery mass, which became slightly tacky when milled on the rubber mill, for 35 minutes at 30° to 100° C.

To 100 parts of this product was added 20 parts channel black, 2 parts sulfur, 5 parts zinc oxide, 1 part captax and 1 part "Tetrone" A, and the mixture was cured for 60 minutes at 155° C. The resulting product had very good snap and a fair tensile strength.

*Example 3.*—An ethylene/vinyl acetate interpolymer which had a molecular weight of about 20,000 to 30,000, and in which the molal ratio of ethylene to vinyl acetate was about 8:1 was heated in a pyrex vessel surrounded by a Woods metal bath heated to 250° C. A slow stream of nitrogen passed through the pyrex vessel during the pyrolysis. The outgoing nitrogen carried with it acetic acid formed by the pyrolysis. When 8% of acetic acid initially combined in the resin had thus been expelled (time required, 66 minutes), the pyrolysis was stopped. The resinous product was removed, washed with water and then dried on the rubber mill.

The pyrolyzed product was thereafter compounded with 20 parts channel black, 2 parts sulfur, 5 parts zinc oxide, 1 part Captax and 1 part "Tetrone" A, per 100 parts of the resin, and the mixture then cured for 60 minutes at 145° C. The cured product, which had excellent snap, had a tensile strength of 2350 pounds per square inch, and an elongation of 410% at the break point. Moduli were 1700 pounds per square inch at 300% elongation and 500 lbs. per square inch at 100% elongation.

The table illustrates further embodiments of the invention conducted substantially in accord with the procedure of Example 1 except as indicated.

Table

| | Examples | | | |
|---|---|---|---|---|
| | 4 | 5 | 6 | 7 |
| *Pyrolysis* | | | | |
| Polymer | [1] E/VA | E/VA | E/VA | E/VA |
| Molecular weight | 20,000 | 20,000 | | |
| Ratio E/VA | 1.6 | 3 | 1 | .8 |
| Temp. °C | 250 | 280–295 | 250 | 250 |
| Pressure atms | 40 | 1 | 30 | |
| Time mins | 60 | 30 | 60 | 60 |
| *Compounding per 100 parts of E/VA* | | | | |
| Sulfur parts | 2 | 2 | 2 | 2 |
| Zinc oxide do | 5 | 5 | 5 | 5 |
| Tuads do | 1 | 1 | 1 | |
| Channel black do | 20 | 20 | 40 | 20 |
| Tetrone "A" do | | | | 1 |
| *Curing* | | | | |
| Time mins | 60 | 60 | 60 | 60 |
| Temp °C | 155 | 155 | 145 | 145 |
| *Properties of product* | | | | |
| Snap | Good | Very good | Good | Fair |
| Tensile strength p. s. i. | 1250 | 700 | 950 | 1050 |
| Elongation percent | 160 | 380 | 450 | 150 |
| Recovery to do | 5 | 30 | 45 | 0 |

[1] Ethylene vinyl acetate interpolymer.

Generally excellent elastomers can be obtained using per 100 parts of the pyrolyzed ethylene vinyl acetate interpolymer 20 parts of channel black, 2 parts of sulfur, 5 parts of zinc oxide, and 1 part of tetramethyl thiuram disulfide. Accelerators may be added to this general type of composition if desired and the composition may be used with or without channel black. One to ten parts of stearic acid and/or abietic acid may also be added to the above formula as well as up to about 10 parts of benzoyl peroxide.

It is possible to obtain rubber-like materials directly from the pyrolysis reaction without submitting the product to curing treatment or adding compounding agents. These products have been obtained having a tensile strength ranging from 200 to 400 lbs. per square inch with elongations of from 90 to 700%, and with considerable recovery after break. Furthermore, it is possible to pyrolyze and vulcanize in a single step by compounding the interpolymer with sulfur and carbon or other suitable compounding agents, then curing at a temperature below 400° C. while treating, for example, the mixture on rubber rolls.

The interpolymers of ethylene and organic acid esters of vinyl alcohol which may be pyrolyzed and then cured in accord with the invention may have a wide range of ethylene to ester content. This ratio may range from 0.8 to 15 moles of ethylene per mole of the vinyl acylate. Interpolymers having ratios which give excellent products after pyrolysis and curing contain from 6 to 10 molecules of the ethylene per molecule of the vinyl acylate.

The pyrolysis should remove sufficient of the acid groups to give a curable interpolymer. That is, the pyrolysis reaction should form sufficient unsaturate or other groupings within the interpolymer molecule which will result, when the interpolymer is subsequently treated with sulfur, in the desired amount of curing. Accordingly, the amount of the acid removed may vary widely, interpolymers from which in the order of 5% of organic acid is removed can be mildly cured while interpolymers from which 70% of organic acid has been removed can be strongly cured. The amount of acid expelled during the pyrolysis is usually greater than the amount which corresponds to the number of double bonds formed, hence it is possible that other forms of linkages are set up during the pyrolysis. While the nature of these linkages is not known with certainty, it is nevertheless possible to control the pyrolysis, as herein described, to give vulcanizable elastomers of good quality.

The choice and amounts of added ingredients are not limited to those of the specific examples. In general, sulfur may be employed in amounts ranging from 0.25% to 15% of the weight of the polymer, but is generally preferred in amounts of 0.5% to 3.0%; accelerators are used in amounts from 0.1% to 15.0% with preferred range from 0.25% to 10.0%, where the higher limits are reserved for those cases in which the accelerator also furnishes the sulfur; group II metal oxides are employed in amounts from 1% to 30% with a preferred range of 5.0% to 15.0% of the weight of the polymer; and reenforcing agents such as carbon black and fillers are used in amounts up to 60% of the weight of the polymer, the preferred range being dependent on the properties desired in the final product.

Among the rubber vulcanization accelerators that may be used are 2-mercaptothiazoline, dipentamethylenethiuram tetrasulfide, piperidinium pentamethylenedithiocarbamate, diphenylguanidine, tetraethylthiuram disulfide benzothiazyl disulfide, mercaptobenzothiazole, tetramethylthiuram disulfide, tetramethylthiuram monosulfide, etc. Of special note is the use of thiuram tetrasulfide accelerators, which act as dual purpose curing agents. Materials of this class liberate sulfur during the curing process and hence make it unnecessary to supply additional elementary sulfur, though, of course, this can be done if desired. Thiuram tetrasulfides are represented by the general formula

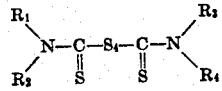

wherein the R's are hydrocarbon radicals which may be alike or different. Also, the two radicals attached to a common nitrogen atom may be joined together to form a single cyclic divalent radical, as in the case of the dipentamethylenethiuram tetrasulfide of the examples. Other examples of this class of accelerators are di(phenylethyl)thiuram tetrasulfide, tetraethylthiuram tetrasulfide, tetrabutylthiuram tetrasulfide, tetramehylthiuram tetrasulfide, di(phenylmethyl)-thiuram tetrasulfide and others such as described in U. S. 1,634,925 and U. S. 1,681,717.

Any group II metal oxide may be used, more particularly zinc oxide, magnesium oxide, calcium oxide, barium oxide, and mixtures thereof.

It is frequently desirable to add other compounding ingredients such as antioxidants, lubricants, stabilizers, blowing agents when sponge is desired, other fillers and the like to improve the texture and aging properties of the cured stock.

The curing procedure is also subject to wide variation, both in regard to the time and temperature of treatment. It may be carried out in a mold, press, or in the absence of external pressure as, for example, in the preparation of spongy articles where a blowing agent is employed. In general, temperatures of 120 to 180° C. are employed for periods ranging from 15 to 60 minutes.

Since the products of this invention vary from soft, elastic materials to hard, horny substances resembling hard rubber, and since they can be prepared in any desired shape by molding, they are useful in numerous fields where their pliability, solvent resistance, nonthermoplasticity, or rubber properties make them applicable. Among the uses for the pliable compositions are bathing apparel (belts, caps, capes, etc.), dental goods (dental dams), drug and surgical supplies (sheeting, tubing, teething rings, nipples, ice bags, etc.), flooring (floor mats, stair treads), footwear (rubber, heels, taps, impregnated soles, etc.), household items (jar rings, bottle caps, buttons, coasters, fly swatters, wedges, sink stoppers, aprons, gloves, kneeling pads, ash trays, mats, plate wipers, etc.), insulated wire and cable, laboratory supplies (tubing, stoppers, aprons), latex products (can closures, jar rings, etc.), mechanical goods (belting, hose, mountings, gaskets, valve discs, rolls, washers, grommets, auto mats, pedal rubbers, tires for toys, tank linings, windshield wipers, etc.), proofed goods (auto fabrics, crib sheets, shower curtains, raincoats, etc.), sponge rubber products (arm rests, cushions, sponges, mats, toys, baseball plates, etc.), stationer's goods (typewriter feet, telephone bases, coin mats, cord protectors, etc.), thread, toys and novelties (dolls, molded toys, balls, dog toys, sponge novelties, etc.), vehicle accessories (top dressing, tires, pedal pads, etc.).

The hard rubber-like products are useful as binders for paint brush bristles, battery cases, insulators, and the like.

We claim:

1. A process of curing an interpolymer of ethylene and an organic monocarboxylic acid ester of vinyl alcohol which comprises heating an intimate mixture of sulfur and an interpolymer of ethylene and an organic monocarboxylic acid ester of vinyl alcohol which has been pyrolyzed at a temperature between approximately 250 and 400° C. whereby an elastomer is obtained.

2. A process of curing an interpolymer of ethylene and an organic monocarboxylic acid ester of vinyl alcohol which comprises heating an intimate mixture of sulfur, a group II metal oxide selected from the group consisting of zinc oxide, magnesium oxide, calcium oxide, and barium oxide, and an interpolymer of ethylene and an organic monocarboxylic acid ester of vinyl alcohol which has been pyrolyzed at a temperature between approximately 250 and approximately 400° C. whereby an elastomer is obtained.

3. A process of curing an interpolymer of ethylene and an organic monocarboxylic acid ester of vinyl alcohol which comprises heating an intimate mixture of sulfur and an interpolymer of ethylene and an organic monocarboxylic acid ester of vinyl alcohol, the interpolymer containing from approximately 0.8 to approximately 15 moles of ethylene per mole of the ester, which has been pyrolyzed at a temperature between approximately 250 and approximately 400° C., the interpolymer containing prior to pyrolysis from 0.8 to 15 moles of ethylene per mole of the organic acid ester there being present during the heating from 0.25 to 15% of sulfur based on the weight of the interpolymer.

4. A process of curing an interpolymer of ethylene and an organic monocarboxylic acid ester of vinyl alcohol which comprises heating an intimate mixture of sulfur and an interpolymer of ethylene and an organic monocarboxylic acid ester of vinyl alcohol, the interpolymer containing from approximately 0.8 to approximately 15 moles of ethylene per mole of the ester from which from 5 to 70% of the organic acid of the interpolymer has been removed by pyrolysis, there being present during the heating from 0.25 to 15% of sulfur based on the weight of the interpolymer.

5. A process of curing an interpolymer of ethylene and vinyl acetate which comprises heating an intimate mixture of sulfur and an interpolymer of ethylene and vinyl acetate which has been pyrolyzed at a temperature between approximately 250 and approximately 400° C., which interpolymer prior to pyrolysis contained from 0.8 to 15 ethylene groups per vinyl acetate group, there being present during the heating from 0.25 to 15% of sulfur based on the weight of the interpolymer.

6. A process for curing an interpolymer of ethylene and vinyl acetate which comprises heating an intimate mixture of sulfur and an interpolymer of ethylene and vinyl acetate containing 0.8 to 15 moles of ethylene per mole of vinyl acetate which has been pyrolyzed until from 5 to 70% of acetic acid has been removed, there being present during the heating from 0.25 to 15% of sulfur based on the weight of the interpolymer.

7. A process of curing an interpolymer of ethylene and vinyl acetate which comprises heating an intimate mixture of sulfur, a group II metal oxide selected from the group consisting of zinc oxide, magnesium oxide, calcium oxide, and barium oxide, a rubber accelerator and in interpolymer of ethylene and vinyl acetate containing 0.8 to 15 moles of ethylene per mole of vinyl acetate which has been pyrolyzed at a temperature between 280 and 325° C., there being present during the heating from 0.25 to 15% of sulfur based on the weight of the interpolymer.

8. A process of curing an interpolymer of ethylene and vinyl propionate which comprises heating to a temperature between approximately 200 and approximately 400° C. an intimate mixture of sulfur and a pyrolyzed interpolymer of ethylene and vinyl propionate there being present during the heating from 0.25 to 15% of sulfur based on the weight of the interpolymer and from 0.8 to 15 moles of ethylene per mole of vinyl propionate.

9. A process of curing an interpolymer of ethylene and vinyl methacrylate which comprises heating to a temperature between approximately 200 and approximately 400° C. an intimate mixture of sulfur and a pyrolyzed interpolymer of ethylene and vinyl methacrylate there being present during the heating from 0.25 to 15% of sulfur based on the weight of the interpolymer and from 0.8 to 15 moles of ethylene per mole of vinyl methacrylate.

10. A process of molding and curing an interpolymer of ethylene and an organic monocarboxylic acid ester of vinyl alcohol which comprises heating to a temperature between approximately 200 and approximately 400° C. in a mold under pressure an intimate mixture of sulfur and a pyrolyzed interpolymer of ethylene and an organic monocarboxylic acid ester of vinyl alcohol there being present during the heating from 0.25 to 15% of sulfur based on the weight of the interpolymer, the interpolymer containing from approximately 0.8 to approximately 15 moles of ethylene per mole of the ester.

11. A process of molding and curing an interpolymer of ethylene and an organic monocarboxylic acid ester of vinyl alcohol which comprises heating to a temperature between approximately 200 and approximately 400° C. in a mold under pressure an intimate mixture of sulfur, a group II metal oxide selected from the group consisting of zinc oxide, magnesium oxide, calcium oxide, and barium oxide, and a pyrolyzed interpolymer of ethylene and an organic monocarboxylic acid ester of vinyl alcohol, there being present during the heating from 0.25 to 15% of sulfur based on the weight of the interpolymer, the interpolymer containing from approximately 0.8 to approximately 15 moles of ethylene per mole of the ester.

12. A cured pyrolyzed interpolymer of ethylene and an organic acid ester of vinyl alcohol obtained in accord with the process of claim 2.

13. A cured pyrolyzed interpolymer of ethylene and vinyl acetate obtained in accord with the process of claim 7.

14. A cured pyrolyzed interpolymer of ethylene and vinyl propionate obtained in accord with the process of claim 8.

15. A cured pyrolyzed interpolymer of ethylene and vinyl methacrylate obtained in accord with the process of claim 9.

AMBROSE McALEVY.
DANIEL E. STRAIN.
FRANKLIN S. CHANCE.